(12) United States Patent
Hiramoto et al.

(10) Patent No.: US 9,161,017 B2
(45) Date of Patent: Oct. 13, 2015

(54) 3D IMAGE CAPTURE DEVICE

(75) Inventors: Masao Hiramoto, Osaka (JP); Yasunori Ishii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 376 days.

(21) Appl. No.: 13/812,909

(22) PCT Filed: Jul. 4, 2012

(86) PCT No.: PCT/JP2012/004315
§ 371 (c)(1),
(2), (4) Date: Jan. 29, 2013

(87) PCT Pub. No.: WO2013/021542
PCT Pub. Date: Feb. 14, 2013

(65) Prior Publication Data
US 2013/0147926 A1 Jun. 13, 2013

(30) Foreign Application Priority Data

Aug. 11, 2011 (JP) ................................ 2011-175936

(51) Int. Cl.
*H04N 13/00* (2006.01)
*H04N 9/04* (2006.01)
(Continued)

(52) U.S. Cl.
CPC .............. *H04N 13/025* (2013.01); *G03B 35/04* (2013.01); *G03B 35/10* (2013.01); *G03B 35/12* (2013.01); *H04N 13/0207* (2013.01); *H04N 13/0214* (2013.01); *H04N 13/0257* (2013.01)

(58) Field of Classification Search
CPC ....... H04N 9/077; H04N 11/08; H04N 11/10; H04N 13/0246; H04N 13/026; H04N 13/0257; H04N 13/0282
USPC ................. 348/267, 268, 269, 270, 42, 45, 49
See application file for complete search history.

(56) References Cited

U.S. PATENT DOCUMENTS 4,934,824 A 6/1990 Ling
6,788,338 B1 * 9/2004 Dinev et al. ................ 348/222.1
(Continued)

FOREIGN PATENT DOCUMENTS

JP 62-217790 A 9/1987
JP 62-291292 A 12/1987
(Continued)

OTHER PUBLICATIONS

International Search Report for corresponding International Application No. PCT/JP2012/004315 mailed Oct. 16, 2012.
(Continued)

*Primary Examiner* — Sinh Tran
*Assistant Examiner* — Xi Wang
(74) *Attorney, Agent, or Firm* — Renner, Otto, Boisselle & Sklar, LLP

(57) ABSTRACT

This 3D image capture device includes: a light-transmitting section 1 including first and second light-transmitting areas 1L and 1R; an image sensor 2a arranged to receive the light transmitted through the light-transmitting section 1; an imaging section 3 that produces an image on an imaging area of the image sensor 2a; and an image capturing driving section that drives the image sensor so as to perform image capturing sessions at least twice in a row and drives the light-transmitting section so that the first and second light-transmitting areas change their positions every image capturing session. The first light-transmitting area 1L transmits light falling within a first wavelength range included in a color red wavelength range and light falling within a second wavelength range included in a color green wavelength range. The second light-transmitting area 1R transmits light falling within a third wavelength range, included in the color green wavelength range and shorter than the second wavelength range, and light falling within a fourth wavelength range included in a color blue wavelength range.

8 Claims, 10 Drawing Sheets

(51) Int. Cl.
- *H04N 9/083* (2006.01)
- *H04N 13/02* (2006.01)
- *G03B 35/04* (2006.01)
- *G03B 35/10* (2006.01)
- *G03B 35/12* (2006.01)

(56) References Cited

U.S. PATENT DOCUMENTS

| | | |
|---|---|---|
| 6,807,295 B1 | 10/2004 | Ono |
| 2002/0171740 A1* | 11/2002 | Seo .......................... 348/207.99 |
| 2003/0043287 A1* | 3/2003 | Kakiuchi et al. .............. 348/269 |
| 2003/0160881 A1* | 8/2003 | Roddy et al. .................. 348/272 |
| 2004/0125205 A1* | 7/2004 | Geng ............................ 348/142 |
| 2005/0030659 A1* | 2/2005 | Asakawa ....................... 359/892 |
| 2005/0237487 A1* | 10/2005 | Chang .............................. 353/7 |
| 2007/0177004 A1* | 8/2007 | Kolehmainen et al. ......... 348/42 |
| 2007/0201738 A1 | 8/2007 | Toda et al. |
| 2007/0285539 A1* | 12/2007 | Shimizu et al. ............... 348/272 |
| 2008/0094588 A1* | 4/2008 | Cole et al. ..................... 353/122 |
| 2008/0158343 A1* | 7/2008 | Schechterman et al. ........ 348/45 |
| 2008/0170143 A1* | 7/2008 | Yoshida ........................ 348/294 |
| 2009/0284627 A1 | 11/2009 | Bando et al. |
| 2010/0066854 A1 | 3/2010 | Mather et al. |
| 2011/0050859 A1* | 3/2011 | Kimmel et al. .................. 348/50 |
| 2011/0149051 A1* | 6/2011 | Jang ................................ 348/51 |
| 2012/0002018 A1 | 1/2012 | Hiramoto et al. |

FOREIGN PATENT DOCUMENTS

| | | |
|---|---|---|
| JP | 63-502057 A | 8/1988 |
| JP | 02-171737 A | 7/1990 |
| JP | 2001-016611 A | 1/2001 |
| JP | 2002-344999 A | 11/2002 |
| JP | 2003-134533 A | 5/2003 |
| JP | 2007-017536 A | 1/2007 |
| JP | 2007-053731 A | 3/2007 |
| JP | 2009-276294 A | 11/2009 |
| JP | 2010-038788 A | 2/2010 |
| JP | 2010-079298 A | 4/2010 |
| WO | 2011/083543 A1 | 7/2011 |

OTHER PUBLICATIONS

Form PCT/ISA/237 corresponding International Application No. PCT/JP2012/004315 dated Oct. 16, 2012.

Moriue et al., "A Real-time Monocular Stereo System Using a Viewpoint Switching Iris", Transactions of the 27th Annual Conference of the Robotics Society of Japan, 3R2-06,2009 and English abstract (cited in [0052] of the specification).

* cited by examiner (a)

ROTATE (b)

3D IMAGE CAPTURE DEVICE

TECHNICAL FIELD

The present application relates to a single-lens 3D image capturing technology for generating a parallax image using a single optical system and a single image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well.

As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality although they require the viewer to wear a pair of polarization glasses have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as a "multi-viewpoint image") by using a single camera have been researched and developed. Such a method is called a "single-lens image capturing method".

For example, Patent Document No. 1 discloses a scheme that uses two polarizers, of which the transmission axes cross each other at right angles, and a rotating polarization filter. FIG. 11 is a schematic representation illustrating an arrangement for an image capturing system that adopts such a scheme. This imaging area includes a 0-degree-polarization polarizer 11, a 90-degree-polarization polarizer 12, a reflective mirror 13, a half mirror 14, a circular polarization filter 15, a driver 16 that rotates the circular polarization filter 15, an optical lens 3, and an image capture device 29 which captures the image that has been produced by the optical lens 3. In this arrangement, the half mirror 14 reflects the light that has been transmitted through the polarizer 11 and then reflected from the reflective mirror 13 but transmits the light that has been transmitted through the polarizer 12. With such an arrangement, the light beams that have been transmitted through the two polarizers 11 and 12, which are arranged at two different positions, pass through the half mirror 14, the circular polarization filter 15 and the optical lens 3 and then enter the image capture device 29, where an image is captured. The image capturing principle of this scheme is that two images with parallax are captured by rotating the circular polarization filter 15 so that the light beams that have been incident on the two polarizers 11 and 12 are imaged at mutually different times.

According to such a scheme, however, images at mutually different positions are captured time-sequentially by rotating the circular polarization filter 15, and therefore, two images with parallax cannot be captured at the same time, which is a problem. On top of that, since all of the incoming light passes through the polarizers 11, 12 and the polarization filter 15, the quantity of the light received eventually by the image capture device 29 decreases by as much as 50%, which is non-negligible, either.

To overcome these problems, Patent Document No. 2 discloses a scheme for capturing two images with parallax at the same time without using such mechanical driving. An image capture device that adopts such a scheme gets the two incoming light beams, which have come from two different directions, condensed by a reflective mirror, and then received by an image sensor in which two different kinds of polarization filters are arranged alternately, thereby capturing two images with parallax without using mechanical driving.

FIG. 12 is a schematic representation illustrating an arrangement for an image capturing system that adopts such a scheme. This image capturing system includes two polarizers 11 and 12, of which the transmission axes are arranged to cross each other at right angles, reflective mirrors 13, an optical lens 3, and an image sensor 2. On its imaging area, the image sensor 2 has a number of pixels 10 and polarization filters 17 and 18, each of which is provided one to one for an associated one of the pixels. Those polarization filters 17 and 18 are arranged alternately over all of those pixels. In this case, the transmission axis directions of the polarization filters 17 and 18 agree with those of the polarizers 11 and 12, respectively.

With such an arrangement, the incoming light beams are transmitted through the polarizers 11 and 12, reflected from the reflective mirrors 13, passed through the optical lens 3 and then incident on the imaging area of the image sensor 1. Those light beams to be transmitted through the polarizers 11 and 12, respectively, and then incident on the image sensor 1 are transmitted through the polarization filters 17 and 18 and then photoelectrically converted by the pixels that are located right under those polarization filters 17 and 18. If the images to be produced by those light beams that have been transmitted through the polarizers 11 and 12 and then incident on the image sensor 1 are called a "right-eye image" and a "left-eye image", respectively, then the right-eye image and the left-eye images are generated by a group of pixels that face the polarization filters 17 and a group of pixels that face the polarization filter 18, respectively.

As can be seen, according to the scheme disclosed in Patent Document No. 2, two kinds of polarization filters, of which the transmission axes are arranged so as to cross each other at right angles, are arranged alternately over the pixels of the image sensor, instead of using the circular polarization filter disclosed in Patent Document No. 1. As a result, although the resolution decreases to a half compared to the method of Patent Document No. 1, a right-eye image and a left-eye image with parallax can be obtained at the same time by using a single image sensor. According to such a technique, however, the incoming light has its quantity decreased considerably when being transmitted through the polarizers and the polarization filters, and therefore, the quantity of the light received by the image sensor decreases as significantly as in Patent Document No. 1.

To cope with such a problem of the decreased quantity of light received, Patent Document No. 3 discloses a technique for obtaining two images with parallax and a normal image with a single image sensor. According to such a technique, those two images with parallax and the normal image can be obtained by a single image sensor by changing mechanically some components that have been used to capture two images with parallax with alternative components for use to capture a normal image, and vice versa. When two images with parallax are going to be obtained, two polarization filters are arranged on the optical path as disclosed in Patent Document No. 2. On the other hand, when a normal image is going to be obtained, those polarization filters are mechanically removed from the optical path. By introducing such a mechanism, those images with parallax and a normal image that uses the incoming light highly efficiently can be obtained.

Although a polarizer or a polarization filter is used according to the techniques disclosed in Patent Document Nos. 1 to 3, color filters may also be used according to another approach. For example, Patent Document No. 4 discloses a technique for obtaining two images with parallax at the same time using color filters. FIG. 13 schematically illustrates an image capturing system as disclosed in Patent Document No. 4. The image capturing system includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film. In the meantime, only red- and blue-based light rays are respectively transmitted through the two color filters 20a and 20b of the light beam confining plate 20. As a result, a magenta-based color image is produced on the photosensitive film by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 4, a multi-viewpoint image can be produced using the two color filters.

According to the technique disclosed in Patent Document No. 4, the light rays are imaged on the photosensitive film, thereby producing images with parallax there. Meanwhile, Patent Document No. 5 discloses a technique for producing images with parallax by transforming incoming light into electrical signals. FIG. 14 schematically illustrates a light beam confining plate according to Patent Document No. 5. According to such a technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 6 also discloses a technique for obtaining images with parallax using a similar configuration to the one used in Patent Document No. 5. FIG. 15 schematically illustrates a light beam confining plate as disclosed in Patent Document No. 6. According to that technique, by making the incoming light pass through R, G and B areas 23R, 23G and 23B of the light beam confining plate 23, images with parallax can also be produced.

Patent Document No. 7 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. And by defining corresponding points between those images on a pixel-by-pixel basis, the magnitude of parallax can be calculated.

And based on the magnitude of parallax calculated and information about the focal length of the camera, the distance from the camera to the subject can be obtained. Patent Document No. 8 discloses a technique for obtaining information about a subject distance based on two images that have been generated using either a diaphragm to which two color filters with mutually different aperture sizes are attached or a diaphragm to which two color filters in two different colors are attached horizontally symmetrically with respect to the optical axis. According to such a technique, if light rays that have been transmitted through red and blue color filters with mutually different aperture sizes are observed, the degrees of blur observed vary from one color to another. That is why the degrees of blur of the two images that are associated with the red and blue color filters vary according to the subject distance. By defining corresponding points with respect to those images and comparing their degrees of blur to each other, information about the distance from the camera to the subject can be obtained. On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 4 to 8 mentioned above, images with parallax can be produced by arranging RGB color filters on a light beam confining plate. However, since a light beam confining plate is used, the percentage of the incoming light that can be used decreases significantly. In addition, to increase the effect of parallax, those RGB color filters should be arranged at distant positions and should have decreased areas. In that case, however, the percentage of the incoming light that can be used further decreases.

Unlike these techniques, Patent Document No. 9 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 62-291292
Patent Document No. 2: Japanese Laid-Open Patent Publication No. 62-217790
Patent Document No. 3: Japanese Laid-Open Patent Publication No. 2001-016611
Patent Document No. 4: Japanese Laid-Open Patent Publication No. 2-171737
Patent Document No. 5: Japanese Laid-Open Patent Publication No. 2002-344999
Patent Document No. 6: Japanese Laid-Open Patent Publication No. 2009-276294
Patent Document No. 7: Japanese Laid-Open Patent Publication No. 2010-38788
Patent Document No. 8: Japanese Laid-Open Patent Publication No. 2010-79298
Patent Document No. 9: Japanese Laid-Open Patent Publication No. 2003-134533

Non-Patent Literature

Non-Patent Document No. 1: Yuta MORIUE, Takeshi TAKAKI, and Idaku ISHII, A Real-time Monocular Stereo System Using a Viewpoint Switching Iris, Transactions of the 27$^{th}$ Annual Conference of the Robotics Society of Japan, 3R2-06, 2009.

SUMMARY OF INVENTION

Technical Problem

Even if such a traditional technique that uses either polarizers or color filters is adopted, multi-viewpoint images can be certainly generated, but the quantity of the light that eventually enters the image sensor decreases significantly as the incoming light needs to pass through the polarizers or color filters. A normal image that uses the incoming light highly efficiently can be obtained by using a mechanism that removes either the polarizing areas or color filters from the optical path in order to make a sufficient quantity of light incident. However, even if such an arrangement is adopted, the percentage of the light that can be used to generate the multi-viewpoint images themselves is still low and the same old problem persists.

Thus, in order to overcome such problems while taking into account the fact that color filters can be made at a lower cost than polarizers, an embodiment of the present invention provides an image capturing technology, by which multi-viewpoint images can be obtained with the incoming light used highly efficiently by using color filters.

Solution to Problem

To overcome these problems, a 3D image capture device according to an aspect of the present invention includes: a light-transmitting section including first and second light-transmitting areas; an image sensor that is arranged to receive the light that has been transmitted through the light-transmitting section; an imaging section that produces an image on an imaging area of the image sensor; and an image capturing driving section that drives the image sensor and the light-transmitting section. The first light-transmitting area has a property to transmit light falling within a first wavelength range that is included in a color blue wavelength range and light falling within a second wavelength range that is included in a color green wavelength range. The second light-transmitting area has a property to transmit light falling within a third wavelength range, which is included in the color green wavelength range and of which the wavelength is longer than the second wavelength range, and light falling within a fourth wavelength range that is included in a color red wavelength range. The image capturing driving section drives the image sensor so as to perform image capturing sessions at least twice in a row and drives the light-transmitting section so that the first and second light-transmitting areas change their positions with each other every time an image capturing session is carried out.

This general and particular embodiment can be implemented as a system, a method, a computer program or a combination thereof.

Advantageous Effects of Invention

According to an embodiment of the present invention, multi-viewpoint images can be generated with the incoming light used more efficiently than in the related art.

Figure 1:
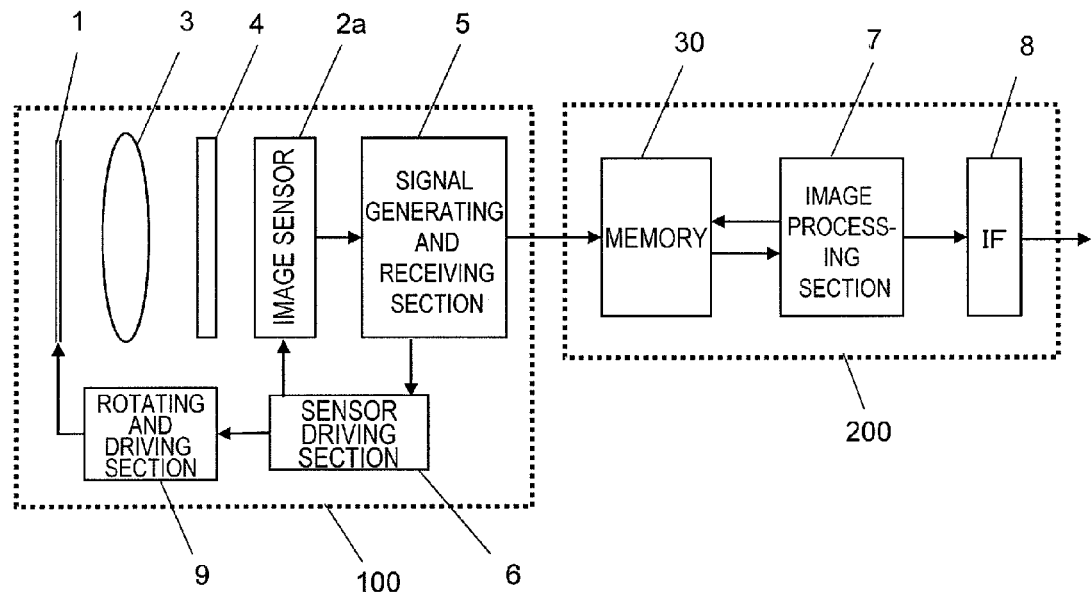
FIG. 1 A block diagram illustrating a configuration for an image capture device as a first embodiment.

DESCRIPTION OF EMBODIMENTS (1) To overcome the problems described above, a 3D image capture device according to an aspect of the present invention includes: a light-transmitting section including first and second light-transmitting areas, the first light-transmitting area having a property to transmit light falling within a first wavelength range that is included in a color blue wavelength range and light falling within a second wavelength range that is included in a color green wavelength range, the second light-transmitting area having a property to transmit light falling within a third wavelength range, which is included in the color green wavelength range and of which the wavelength is longer than the second wavelength range, and light falling within a fourth wavelength range that is included in a color red wavelength range; an image sensor that is arranged to receive the light that has been transmitted through the light-transmitting section; an imaging section that produces an image on an imaging area of the image sensor; and an image capturing driving section that drives the image sensor so as to perform image capturing sessions at least twice in a row and that drives the light-transmitting section so that the first and second light-transmitting areas change their positions with each other every time an image capturing session is carried out.

(2) In one embodiment, the 3D image capture device of (1) further includes an image processing section that generates multi-viewpoint images based on a pixel signal supplied from the image sensor.

(3) In one embodiment of the 3D image capture device of (1) or (2), the image sensor has a plurality of pixel blocks that are arranged two-dimensionally on the imaging area, and each of the plurality of pixel blocks includes first, second, third and fourth pixels that mainly sense light rays falling within the first, second, third and fourth wavelength ranges, respectively.

(4) In one embodiment of the 3D image capture device of one of (1) to (3), the first and second light-transmitting areas are configured so that the sum of a function representing a spectral transmittance characteristic of the first light-transmitting area and a function representing a spectral transmittance characteristic of the second light-transmitting area does not have wavelength dependence.

(5) In one embodiment of the 3D image capture device of one of (1) to (4), the light-transmitting section further includes a transparent area.

(6) In one embodiment of the 3D image capture device of one of (1) to (5), the second wavelength range is from 500 nm to 550 nm and the third wavelength range is from 550 nm to 600 nm.

(7) In one embodiment of the 3D image capture device of one of (1) to (6), the image sensor has a Bayer type pixel arrangement.

(8) In one embodiment of the 3D image capture device of one of (1) to (7), the first and second light-transmitting areas are arranged symmetrically with respect to the center of the light-transmitting section, and the image capturing driving section rotates the light-transmitting section 180 degrees on the center of the light-transmitting section as the axis of rotation, thereby changing the positions of the first and second light-transmitting areas with each other every image capturing session.

(9) An image processor according to an aspect of the present invention generates multi-viewpoint images based on a signal supplied from a 3D image capture device. The device includes: a light-transmitting section including first and second light-transmitting areas, the first light-transmitting area having a property to transmit light falling within a first wavelength range that is included in a color blue wavelength range and light falling within a second wavelength range that is included in a color green wavelength range, the second light-transmitting area having a property to transmit light falling within a third wavelength range, which is included in the color green wavelength range and of which the wavelength is longer than the second wavelength range, and light falling within a fourth wavelength range that is included in a color red wavelength range; an image sensor that is arranged to receive the light that has been transmitted through the light-transmitting section; an imaging section that produces an image on an imaging area of the image sensor; and an image capturing driving section that drives the image sensor so as to perform image capturing sessions at least twice in a row and that drives the light-transmitting section so that the first and second light-transmitting areas change their positions with each other every time an image capturing session is carried out.

Hereinafter, embodiments of the present invention will be described in further detail with reference to the accompanying drawings. In the following description, any element shown in multiple drawings and having the same or similar function will be identified by the same reference numeral. It should be noted that a signal or information representing an image will be sometimes referred to herein as just an "image".

Embodiment 1

FIG. 1 is a block diagram illustrating an overall configuration for an image capture device as a first embodiment of the present invention. The image capture device of this embodiment is a digital electronic camera and includes an image capturing section 100 and a signal processing section 200 that generates a signal representing an image (i.e., an image signal) based on the signal generated by the image capturing section 100.

The image capturing section 100 includes a color solid-state image sensor 2a (which will be simply referred to herein as an "image sensor") with a number of photosensitive cells that are arranged on its imaging area, a light transmitting plate (light-transmitting section) 1 with two light-transmitting areas, of which the transmittances have different wavelength dependences (i.e., different spectral transmittance characteristics), an optical lens 3 for producing an image on the imaging area of the image sensor 2a, and an infrared cut filter 4. The image capturing section 100 further includes a signal generating and receiving section 5, which not only generates a fundamental signal to drive the image sensor 2a but also receives the output signal of the image sensor 2a and sends it to the signal processing section 200, a sensor driving section 6 for driving the image sensor 2a in accordance with the fundamental signal generated by the signal generating and receiving section 5, and a rotating and driving section 9 which rotates the light-transmitting plate 1. In this embodiment, the signal generating and receiving section 5, the sensor driving section 6 and the rotating and driving section 9 functions, in combination, as an image capturing driving section according to the present invention.

The image sensor 2a is typically a CCD or CMOS sensor, which may be fabricated by known semiconductor device processing technologies. The signal generating and receiving section 5 and the sensor driving section 6 may be implemented as an LSI such as a CCD driver. The rotating and driving section 9 has a motor that rotates the light-transmitting plate 1 and can rotate, along with the sensor driving section 6, the light-transmitting plate 1 on its center as the axis of 27 rotation.

The signal processing section 200 includes an image processing section 7 which processes the output signal of the image capturing section 100 to generate multi-viewpoint images, a memory 30 which stores various kinds of data for use to generate the image signal, and an interface (I/F) section 8 which sends out the image signal thus generated to an external device. The image processing section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image processing section 7 or compressed image data. These image data are then output either a storage medium or a display section (neither is shown) by way of the interface section 8.

The image capture device of this embodiment actually further includes an electronic shutter, a viewfinder, a power supply (or battery), a flashlight and other known components. However, the description thereof will be omitted herein because none of them are essential components that would make it difficult to understand how this embodiment works unless they were described in detail. Also, this configuration is only an example. Thus, in this embodiment, additional components other than the light-transmitting plate 1, the image sensor 2a and the image processing section 7 may be implemented as an appropriate combination of known elements.

Next, the configuration of the image capturing section 100 will be described in further detail. In the following description, the x and y coordinates shown in the drawings will be used.

Figure 2:
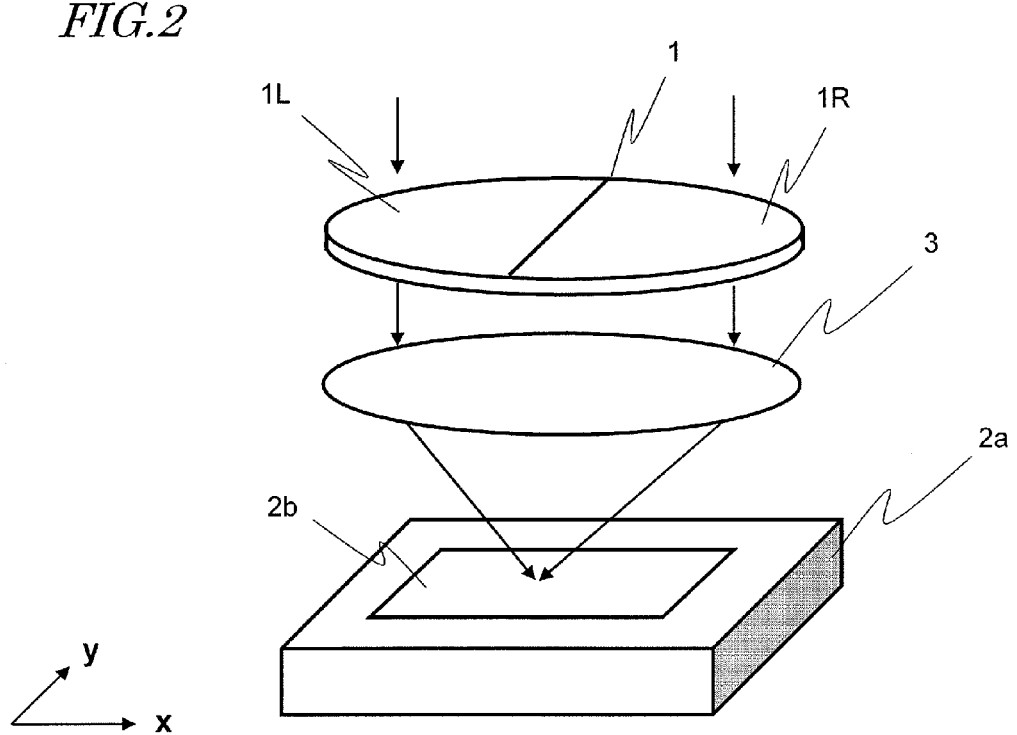
FIG. 2 Schematically illustrates a general arrangement of a light-transmitting plate, an optical lens and an image sensor in the first embodiment.

FIG. 2 schematically illustrates the relative arrangement of the light-transmitting plate 1, the lens 3 and the image sensor 2a in the image capturing section 100. It should be noted that illustration of the other elements is omitted in FIG. 2. The lens 3 may be a lens unit that is a group of lenses but is drawn in FIG. 2 as a single lens for the sake of simplicity. The light-transmitting plate 1 has two light-transmitting areas 1L and 1R that have mutually different spectral transmittance characteristics, and transmits the incoming light at least partially. The lens 3 is a known lens and condenses the light that has been transmitted through the light-transmitting plate 1, thereby imaging the light on the imaging area 2b of the image sensor 2a. It should be noted that the relative arrangement of the respective members shown in FIG. 2 is only an example and does not always have to be adopted according to the present invention. For example, as long as the lens 3 can produce an image on the imaging area 2b, the lens 3 may be arranged more distant from the image sensor 2a than the light-transmitting plate 1 is. Optionally, the lens 3 and the light-transmitting plate 1 may be combined together.

Figure 3:
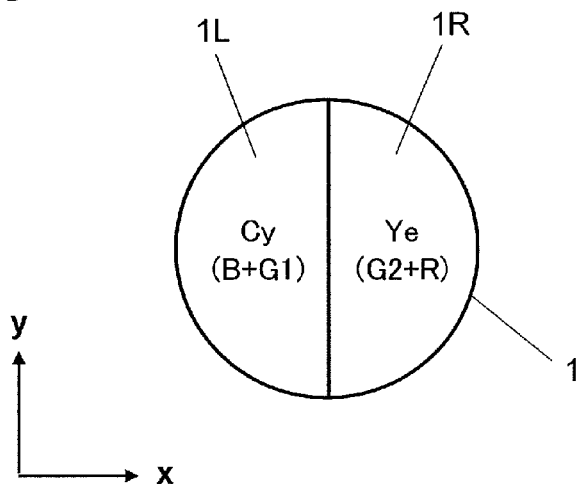
FIG. 3 A front view of the light-transmitting plate according to the first embodiment.

FIG. 3 is a front view of the light-transmitting plate 1 of this embodiment. Even though the light-transmitting plate 1 of this embodiment, as well as the lens 3, has a circular shape, the light-transmitting plate 1 may also have any other shape. The light-transmitting plate 1 is split into two light-transmitting areas 1L and 1R, which are respectively located on the left- and right-hand sides on the paper. In this embodiment, the area 1L is implemented as a cyan (Cy) color filter (which will be referred to herein as a "Cy filter"), and the area 1R is implemented as a yellow (Ye) color filter (which will be referred to herein as a "Ye filter"). Nevertheless, unlike ordinary Cy and Ye filters, the Cy and Ye filters of this embodiment are designed so that their transmittance with respect to light including the color green (G) components becomes low in either the longer wavelength range or the shorter wavelength range. That is to say, the Cy filter is designed to mainly transmit a light ray falling within the color blue (B) wavelength range and a light ray falling within the shorter part (G1) of the color green (G) wavelength range. On the other hand, the Ye filter is designed to mainly transmit a light ray falling within the longer part (G2) of the color green (G) wavelength range and a light ray falling within the color red (R) wavelength range.

Figure 4:
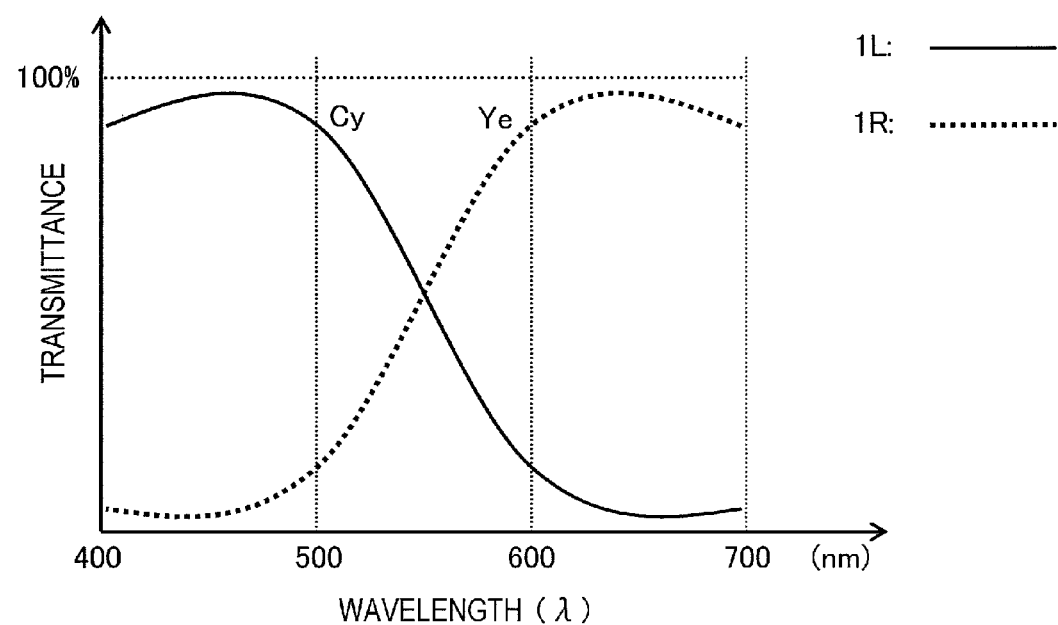
FIG. 4 A graph showing the spectral transmittance characteristic of the light-transmitting plate according to the first embodiment.

FIG. 4 shows exemplary spectral transmittance characteristics of the light-transmitting areas 1R and 1L. In FIG. 4, the abscissa represents the wavelength $\lambda$ of the incoming light and the ordinate represents the optical transmittance. In this example, the range of approximately 400-500 nm is defined to be the B wavelength range, the range of approximately 500-600 nm is defined to be the G wavelength range, and the range of approximately 600-700 nm is defined to be the R wavelength range. Also, in the G wavelength range, the range of approximately 500-550 nm is defined to be the G1 wavelength range and the range of approximately 550-600 nm is defined to be the G2 wavelength range. However, these definitions are made just for convenience sake. And it may be determined arbitrarily what wavelength range represents what color. As shown in FIG. 4, both of the Cy and Ye filters of this embodiment transmit only a half of the light with G components compared to ordinary Cy and Ye filters. As a result, the sum of the function representing the spectral transmittance characteristic of the Cy filter and the function representing the spectral transmittance characteristic of the Ye filter becomes a function representing the spectral transmittance characteristic of transparent light. Consequently, it is possible to prevent the light-transmitting plate 1 from coloring the incoming light.

Figure 5:
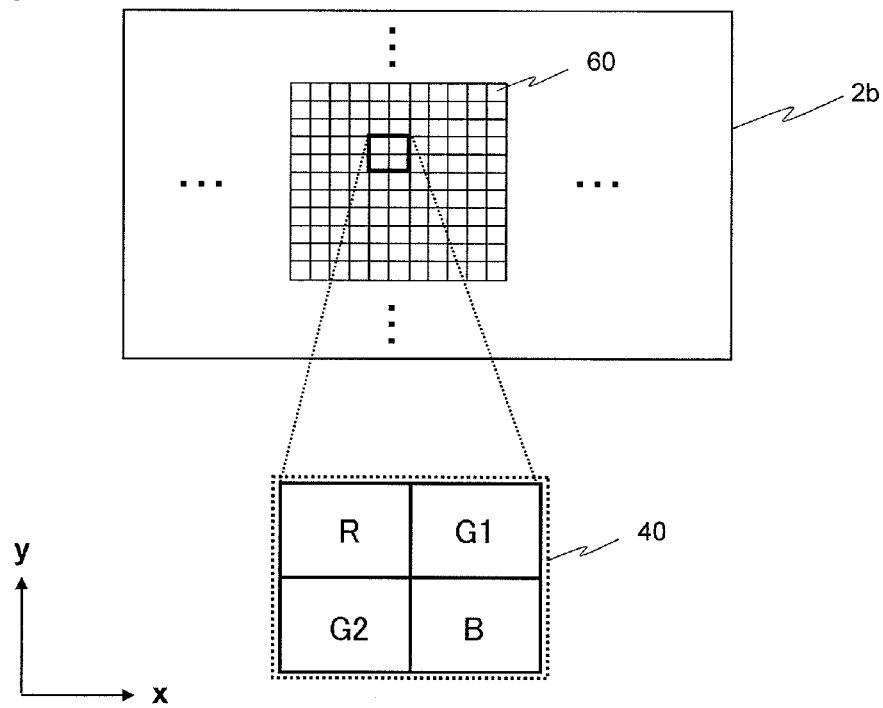
FIG. 5 Illustrates the basic color arrangement of an image sensor according to the first embodiment.

FIG. 5 illustrates only some of the photosensitive cells 60 that are arranged in columns and rows on the imaging area 2b of the image sensor 2a. Each of those photosensitive cells 60 typically includes a photodiode and performs photoelectric conversion and outputs a photoelectrically converted signal (pixel signal) representing the quantity of light received. A color filter (which will also be referred to herein as a "color element") is arranged closer to the light source so as to face each of those photosensitive cells 60.

As shown in FIG. 5, the color filter arrangement of this embodiment is made up of multiple 2×2 unit matrices. In each unit matrix, a red (R) element is arranged at the row 1, column 1 position, a first green (G1) element is arranged at the row 1, column 2 position, a second green (G2) element is arranged at the row 2, column 1 position, and a blue (B) element is arranged at the row 2, column 2 position. This is a so-called Bayer arrangement but the two green elements thereof have a different spectral transmittance characteristic from an ordinary green element. In the following description of this embodiment, the B element and a photosensitive cell that faces it will be sometimes referred to herein as a "first pixel". Likewise, the G1 element and a photosensitive cell that faces it will be sometimes referred to herein as a "second pixel", the G2 element and a photosensitive cell that faces it will be sometimes referred to herein as a "third pixel", and the R element and a photosensitive cell that faces it will be sometimes referred to herein as a "fourth pixel". As shown in FIG. 5, this image sensor 2a has a configuration in which a plurality of pixel blocks 40, each consisting of the first through fourth pixels, are arranged two-dimensionally on the imaging area 2b.

Figure 6:
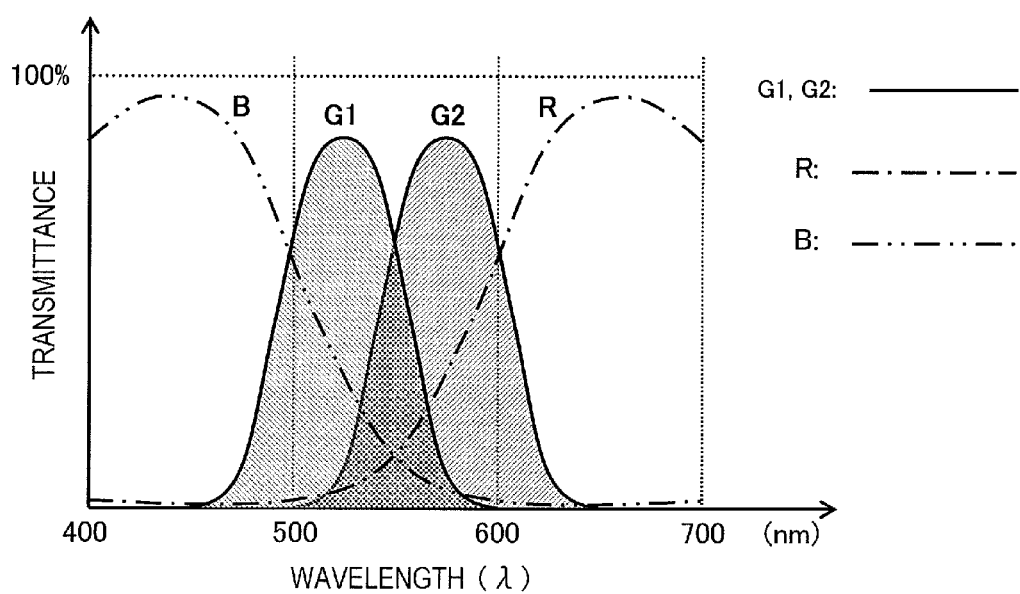
FIG. 6 A graph showing the spectral transmittance characteristics of respective color elements of the image sensor according to the first embodiment.

FIG. 6 shows the spectral transmittance characteristics of the respective color elements of this embodiment. In FIG. 6, the one-dot chain curve represents the transmittance of the R element, the solid curves represent the spectral transmittance characteristics of the G1 and G2 elements, and the two-dot chain curve represents the spectral transmittance characteristic of the B element. This embodiment is characterized by the spectral transmittance characteristics of the G1 and G2 elements. Specifically, the peak of transmittance of the G1 element has shifted toward the color blue range (i.e., toward the shorter wavelength range), while the peak of transmittance of the G2 element has shifted toward the color red range (i.e., toward the longer wavelength range). Also, the sum of the respective transmittances of the B and G1 elements becomes substantially the same as the spectral transmittance characteristic of the light-transmitting area 1L of the light-transmitting plate 1. Likewise, the sum of the respective transmittances of the R and G2 elements becomes substantially the same as the spectral transmittance characteristic of the light-transmitting area 1R of the light-transmitting plate 1.

With such a configuration adopted, the first through fourth pixels of this embodiment mainly sense light rays falling within the R, G1, G2 and B wavelength ranges, respectively, and output photoelectrically converted signals representing the respective intensities of light rays falling within those wavelength ranges.

The light-transmitting areas 1L and 1R of the light-transmitting plate 1 and the respective elements of the image sensor 2a may be made of a known pigment or a multilayer dielectric film, for example. Ideally, the Cy filter of the light-transmitting plate 1 should be designed to transmit only B and G1 light rays and the Ye filter thereof should be designed to transmit only R and G2 light rays. Actually, however, those filters may transmit some light rays representing other colors as well as shown in FIG. 4. Likewise, it is ideal to design R, B, G1 and G2 elements that transmit only R, B, G1 and G2 rays, respectively. However, those elements may actually transmit some light rays representing other colors as well as shown in FIG. 6.

With such a configuration adopted, the light incident on this image capture device during an exposure process is transmitted through the light-transmitting plate 1, the lens 3 and the infrared cut filter 4, imaged on the imaging area 2b of the image sensor 2a, and then photoelectrically converted by respective photosensitive cells 60. Then, photoelectrically converted signals are output from the photosensitive cells 60 to the signal processing section 200 by way of the signal generating and receiving section 5. In the signal processing section 200, the image processing section 7 generates two multi-viewpoint images based on the signals received.

Figure 7:
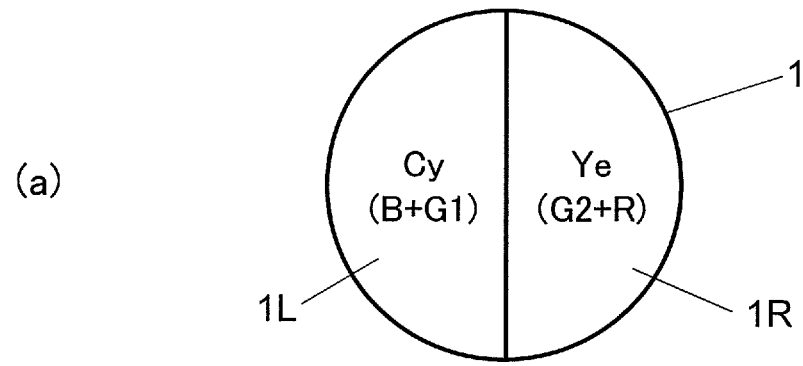
FIG. 7 Illustrates how the light-transmitting plate is rotated according to the first embodiment.
Figure 7:
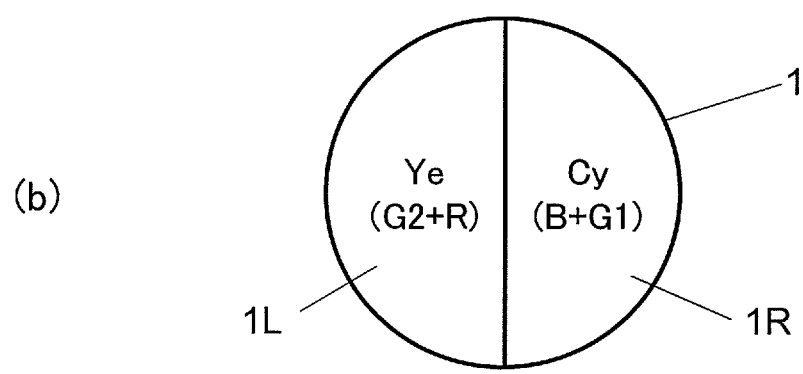

FIG. 7 schematically illustrates the states of the light-transmitting plate 1 while images are going to be captured according to this embodiment. The image capture device of this embodiment captures images twice by rotating the light-transmitting plate 1 as shown in portions (a) and (b) of FIG. 7 and generates a pair of multi-viewpoint images through arithmetic processing. Specifically, as disclosed in Non-Patent Document No. 1, the light-transmitting plate 1 may be rotated by putting a belt on the light-transmitting plate 1 and by running the belt with a motor. The rotating and driving section 9 rotates the light-transmitting plate 1 using such a mechanism and the image sensor 2a obtains pixel signals in the states shown in portions (a) and (b) of FIG. 7.

As can be seen, the Cy and Ye filters change their positions with each other before and after the rotation. In this description, the light-transmitting area shown on the left-hand side on the paper will be identified herein by 1L and the light-transmitting area shown on the right-hand side on the paper by 1R. That is why in the state shown in portion (b) of FIG. 7 in which the light-transmitting plate 1 in the state shown in portion (a) of FIG. 7 has rotated 180 degrees, the Ye filter is located in the light-transmitting area 1L and the Cy filter is located in the light-transmitting area 1R.

Hereinafter, it will be described how this image capture device operates when an image of the subject is captured through the light-transmitting plate 1. As for the respective pixel signals of the image sensor 2a, signals representing the respective intensities of light rays that have been transmitted through the R, G1, G2 and B elements and photoelectrically converted will be identified herein by Rs, G1s, G2s, and Bs, respectively. If image capturing sessions have been performed n times, the signals obtained as a result of the $i^{th}$ image capturing session (where i is an integer and $1 \leq i \leq n$) will be identified herein by Rs(i), G1s(i), G2s(i) and Bs(i), respectively. Even though n==2 in this embodiment, n≥3 may be satisfied as well.

First of all, an image capturing session is carried out for the first time in the state shown in portion (a) of FIG. 7. In this case, R and G2 rays are transmitted more through the light-transmitting area 1R of the light-transmitting plate 1 than through the light-transmitting area 1L. That is why the pixel signals output from the photosensitive cells that face the R and G2 elements of the image sensor 2a include more signal components representing the light transmitted through the light-transmitting area 1R than signal components representing the light transmitted through the light-transmitting area 1L. B and G1 rays, on the other hand, are transmitted more through the light-transmitting area 1L of the light-transmitting plate 1 than through the light-transmitting area 1R. That is why the pixel signals output from the photosensitive cells that face the B and G1 elements of the image sensor 2a include more signal components representing the light transmitted through the light-transmitting area 1L than signal components representing the light transmitted through the light-transmitting area 1R. The pixel signals obtained through this first image capturing session are sent from the signal generating and receiving section 5 to the image processing section 7, where image signals are generated and retained.

Next, the light-transmitting plate 1 in the state shown in portion (a) of FIG. 7 is rotated 180 degrees on its center as the axis of rotation by the rotating and driving section 9 to enter the state shown in portion (b) of FIG. 7. In this state, an image capturing session is carried out for the second time, and the light-transmitting plate 1 assumes the opposite state from the one described above. Thus, the pixel signals output from the photosensitive cells that face the R and G2 elements of the image sensor 2a include more signal components representing the light transmitted through the light-transmitting area 1L than signal components representing the light transmitted through the light-transmitting area 1R. On the other hand, the pixel signals output from the photosensitive cells that face the B and G1 elements of the image sensor 2a include more signal components representing the light transmitted through the light-transmitting area 1R than signal components representing the light transmitted through the light-transmitting area 1L. In this case, the pixel signals are also sent from the signal generating and receiving section 5 to the image processing section 7, where image signals are generated and retained.

Based on the pixel signals Rs(1), Rs(2), G1s(1), G1s(2), G2s(1), G2s(2), Bs(1) and Bs(2) that have been obtained as a result of these two image capturing sessions, signal arithmetic operations are performed, thereby generating multi-viewpoint images. In this case, signals representing the intensities of light rays to be transmitted through the light-transmitting areas 1L and 1R and then photoelectrically converted in a situation where the light-transmitting areas 1L and 1R and the respective color elements on the image sensor 2a are supposed to be completely transparent are identified herein by L and R, respectively. In that case, the relations between the pixel signals Rs(1), Rs(2), G1s(1), G1s(2), G2s(1), G2s(2), Bs(1) and Bs(2) and the signals L and R are given by the following Equations (1) through (4), in which the R, G1, G2 and B components of the signals L and R are respectively identified by the subscripts r, g1, g2 and b attached to the signs L and R. Then, the R, G1, G2 and B components are represented by the following Equations (1), (2), (3) and (4), respectively:

$$\begin{pmatrix} Rs(1) \\ Rs(2) \end{pmatrix} = \begin{pmatrix} rM11 & rM12 \\ rM21 & rM22 \end{pmatrix} \begin{pmatrix} L_r \\ R_r \end{pmatrix} \quad (1)$$

$$\begin{pmatrix} G1s(1) \\ G1s(2) \end{pmatrix} = \begin{pmatrix} g1M11 & g1M12 \\ g1M21 & g1M22 \end{pmatrix} \begin{pmatrix} L_{g1} \\ R_{g1} \end{pmatrix} \quad (2)$$

$$\begin{pmatrix} G2s(1) \\ G2s(2) \end{pmatrix} = \begin{pmatrix} g2M11 & g2M12 \\ g2M21 & g2M22 \end{pmatrix} \begin{pmatrix} L_{g2} \\ R_{g2} \end{pmatrix} \quad (3)$$

$$\begin{pmatrix} Bs(1) \\ Bs(2) \end{pmatrix} = \begin{pmatrix} bM11 & bM12 \\ bM21 & bM22 \end{pmatrix} \begin{pmatrix} L_b \\ R_b \end{pmatrix} \quad (4)$$

In these Equations (1) through (4), each of the 2×2 matrix elements on the right side is a factor of proportionality represented by the wavelength integral value of the transmittance of a light ray that has been transmitted through each light-transmitting area of the light-transmitting plate 1 and incident on photosensitive cells facing the respective color elements of the image sensor 2a. For example, rM11 and rM12 of Equation (1) are factors about the first image capturing session and are represented by the following Equations (5) and (6), respectively:

$$rM11 = K\int_r Cy(\lambda)O(\lambda)R(\lambda)d\lambda \quad (5)$$

$$rM12 = K\int_r Ye(\lambda)O(\lambda)R(\lambda)d\lambda \quad (6)$$

In Equations (5) and (6), K is a constant of proportionality. And supposing the wavelength of the incident light is $\lambda$, the spectral transmittance characteristics of the Cy and Ye filters of the light-transmitting plate 1 are identified by $Cy(\lambda)$ and $Ye(\lambda)$, respectively, the spectral transmittance characteristic of the R element of the image sensor 2a is identified by $R(\lambda)$, and the spectral transmittance characteristic of every other element including the lens 3, the infrared cut filter 4 and the image sensor 2a itself is identified by $O(\lambda)$. The sign r under the integral sign indicates that the integration operation is performed on the R wavelength range. For example, if the wavelength ranges are defined as described above, the integration operation is performed in the range in which $\lambda=600$ to 700 nm.

Also, in Equation (1), rM21 and rM22 are factors for the second image capturing session and rM21=mM12 and rM22=mM11. Since the two image capturing sessions are supposed to be performed continuously within a short period of time according to this embodiment, a variation in the quantity of the incoming light that could be caused between the two image capturing sessions is not taken into account. Thus, the two equations described above are satisfied.

Likewise, the 2×2 matrix elements on the right side of Equations (2) through (4) can also be obtained through similar calculations just by replacing $R(\lambda)$ of Equations (5) and (6) with the spectral transmittance characteristic of each color element and by changing the interval of integration into the wavelength range of that color. That is to say, g1M11, g1M12, g2M11, g2M12, bM11 and bM12 are given by the following Equations (7) through (12), respectively. In the following equations, the spectral transmittance characteristics of the G1, G2, and B elements are identified by $G1(\lambda)$, $G2(\lambda)$ and $B(\lambda)$, respectively:

$$g1M11 = K\int_{g1} Cy(\lambda)O(\lambda)G1(\lambda)d\lambda \quad (7)$$

$$g1M12 = K\int_{g1} Ye(\lambda)O(\lambda)G1(\lambda)d\lambda \quad (8)$$

$$g2M11 = K\int_{g2} Cy(\lambda)O(\lambda)G2(\lambda)d\lambda \quad (9)$$

$$g2M12 = K\int_{g2} Ye(\lambda)O(\lambda)G2(\lambda)d\lambda \quad (10)$$

$$bM11 = K\int_b Cy(\lambda)O(\lambda)B(\lambda)d\lambda \quad (11)$$

$$bM12 = K\int_b Ye(\lambda)O(\lambda)B(\lambda)d\lambda \quad (12)$$

In these Equations (7) through (12), the signs g1, g2 and b under the integral sign indicate that the integration operation is performed on the wavelength ranges of G1, G2 and B, respectively. For example, if the wavelength ranges defined above are adopted, the integration operation is performed in the range in which $\lambda=500$ to 550 nm for Equations (7) and (8), in the range in which $\lambda=550$ to 600 nm for Equations (9) and (10), and in the range in which $\lambda=400$ to 500 nm for Equations (11) and (12), respectively.

As for the factors for this second image capturing session, g1M21=g1M12, g1M22=g1M11, g2M21=g2M12, g2M22=g2M11, bM21=bM12, and bM22=bM11 are satisfied just like the R component.

In the foregoing description, the integration operation is supposed to be performed only within the wavelength range of each particular color component to obtain the respective matrix elements. However, such a method is not necessarily adopted. Alternatively, by using different functions $O(\lambda)$ representing the optical transmittance of a component other than the color filters for the B, G1, G2 and R color components, the integration operation may be performed over the entire wavelength range of visible radiation (e.g., in the range of 400 nm to 700 nm). Still alternatively, the respective matrix elements may also be obtained by performing an integration operation on the entire wavelength range of visible radiation with the function $O(\lambda)$ excluded and by multiplying the result of the integration operation by a constant to be determined with the effect of $O(\lambda)$ taken into account.

The image processing section 7 performs the processing of multiplying both sides of each of Equations (1) to (4) by the inverse matrix of the 2×2 matrix of that equation from the left to the right, thereby obtaining the respective color components of the signal L representing an image to be produced by the light that has been transmitted through the left-side area 1L of the light-transmitting plate 1 and the respective color components of the signal R representing an image to be produced by the light that has been transmitted through the right-side area 1R thereof. The respective color components Lr, Lg1, Lg2 and Lb of the signal L and the respective color components Rr, Rg1, Rg2 and Rb of the signal R are calculated by the following Equations (13) through (16):

$$\begin{pmatrix} L_r \\ R_r \end{pmatrix} = \begin{pmatrix} rM11 & rM12 \\ rM21 & rM22 \end{pmatrix}^{-1} \begin{pmatrix} Rs(1) \\ Rs(2) \end{pmatrix} \quad (13)$$

$$\begin{pmatrix} L_{g1} \\ R_{g1} \end{pmatrix} = \begin{pmatrix} g1M11 & g1M12 \\ g1M21 & g1M22 \end{pmatrix}^{-1} \begin{pmatrix} G1s(1) \\ G1s(2) \end{pmatrix} \quad (14)$$

$$\begin{pmatrix} L_{g2} \\ R_{g2} \end{pmatrix} = \begin{pmatrix} g2M11 & g2M12 \\ g2M21 & g2M22 \end{pmatrix}^{-1} \begin{pmatrix} G2s(1) \\ G2s(2) \end{pmatrix} \quad (15)$$

$$\begin{pmatrix} L_b \\ R_b \end{pmatrix} = \begin{pmatrix} bM11 & bM12 \\ bM21 & bM22 \end{pmatrix}^{-1} \begin{pmatrix} Bs(1) \\ Bs(2) \end{pmatrix} \quad (16)$$

Furthermore, by making the calculations represented by the following Equations (17) and (18), the image processing section 7 generates signals L and R that form those light intensity images.

$$L = L_r + L_{g1} + L_{g2} + L_b \quad (17)$$

$$R = R_r + R_{g1} + R_{g2} + R_b \quad (18)$$

The image processing section 7 performs such signal arithmetic processing on each of the pixel blocks 40 shown in FIG. 5. A set of the signals L, R that have been generated on a pixel block (40) basis in this manner is output as a pair of multi-viewpoint images from the image interface section 8.

As described above, according to this embodiment, by using the light-transmitting plate 1 in which Cy and Ye filters are arranged side by side in the horizontal direction (x direction) and the image sensor 2a with the Bayer arrangement in which two kinds of G elements with mutually different transmittances are arranged, image capturing sessions are performed twice before and after the light-transmitting plate 1 is rotated 180 degrees. By performing arithmetic processing on each color signal using the 2×2 matrix, multi-viewpoint images can be obtained. Since the light-transmitting plate 1 is designed to transmit complementary color rays (Cy, Ye), color multi-viewpoint images can be obtained with good sensitivity by using incoming light more efficiently than in the related art.

Figure 8A:
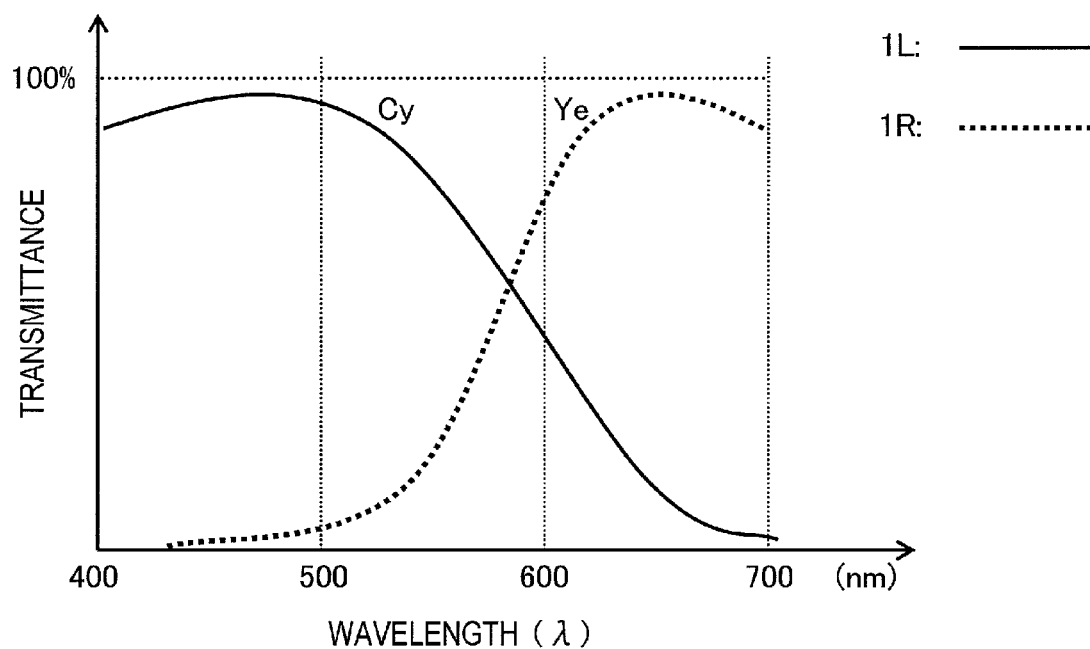
FIG. 8A A graph showing another exemplary spectral transmittance characteristic of a light-transmitting plate as a modified example of the first embodiment.

In the embodiment described above, the Cy and Ye filters of the light-transmitting plate 1 have different spectral transmittance characteristics as shown in FIG. 4 but are designed so that the integral values of their transmittances over the entire wavelength range of visible radiation are substantially equal to each other. However, the Cy and Ye filters do not have to be designed in this manner but the integral value of the transmittances of one of these two filters may be larger than that of the other. For example, as for the transmittance of a green ray, the Cy and Ye filters may also be designed to respectively transmit approximately 70% and approximately 30% of the green ray as shown in FIG. 8A. No matter what spectral transmittance characteristics the Cy and Ye filters have, multi-viewpoint images can also be generated by performing the signal processing described above as long as their function forms are known.

Also, in the embodiment described above, Cy and Ye filters are supposed to be used in the light-transmitting areas 1L and 1R of the light-transmitting plate 1. However, any other combination of color filters may also be used. In any case, if the sum of the spectral transmittance characteristics of those color filters can be called a substantially transparent characteristic, the effects of the embodiment described above can also be achieved. In this description, if something is "transparent", then it means that it has a characteristic with a transmittance of approximately 80% or more with respect to a light ray falling within an arbitrary part of the visible radiation wavelength range. Also, in one embodiment, the two light-transmitting areas 1L and 1R may be configured so that the sum of functions representing their spectral transmittance characteristics does not have wavelength dependence. In this description, if something "does not have wavelength dependence", then it means that the ratio of the minimum value to the maximum value of a function representing the spectral transmittance characteristic in the visible radiation wavelength range falls within the range of approximately 0.8 to 1.0.

Figure 8B:
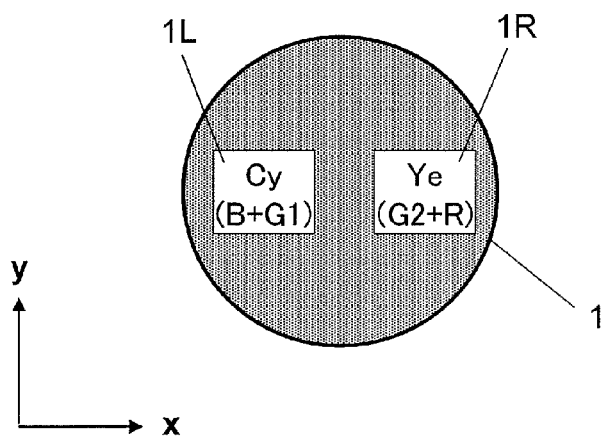
FIG. 8B A front view of the light-transmitting plate as a modified example of the first embodiment.

Furthermore, the two light-transmitting areas 1L and 1R of the light-transmitting plate 1 do not have to be arranged to form two halves of the light-transmitting plate 1. Alternatively, the light-transmitting area 1L may form part of the left half of the light-transmitting plate 1, the light-transmitting area 1R may form part of the right half of the light-transmitting plate 1 and the rest of the light-transmitting plate 1 may be an opaque member as shown in FIG. 8B. If such an arrangement is adopted, the quantity of the incoming light that can be used will decrease, but more perceptible parallax information can be obtained, compared to the arrangement shown in FIG. 3. Even if such an arrangement is adopted, the light-transmitting areas 1L and 1R can still be arranged symmetrically with respect to the center of the light-transmitting plate 1. Also, these two light-transmitting areas 1L and 1R do not have to be designed to have the same size. Even if their sizes are different from each other, their difference can also be compensated for by signal processing.

Figure 8C:
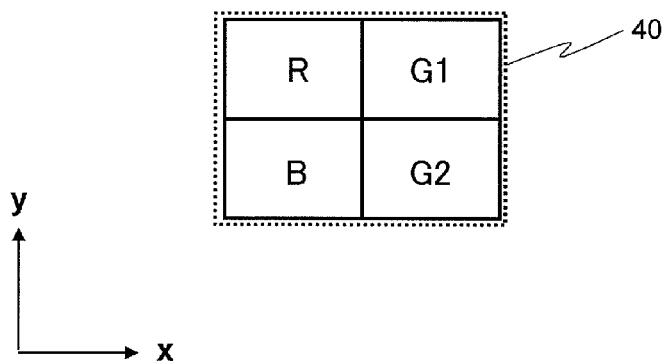
FIG. 8C Illustrates the basic color arrangement according to a modified example of the first embodiment.

Also, as for the color arrangement of the image sensor 2a, even though a Bayer type arrangement is supposed to be used in the embodiment described above, such an arrangement does not have to be used. For example, there is no problem even if the B and G2 elements on the second row change their positions with each other as shown in FIG. 8C. Furthermore, the pixel arrangement of the image sensor 2a does not have to a tetragonal arrangement such as the one shown in FIG. 5 but may also be an oblique arrangement in which pixels are arranged obliquely to the x- and y-axes.

Figure 8D:
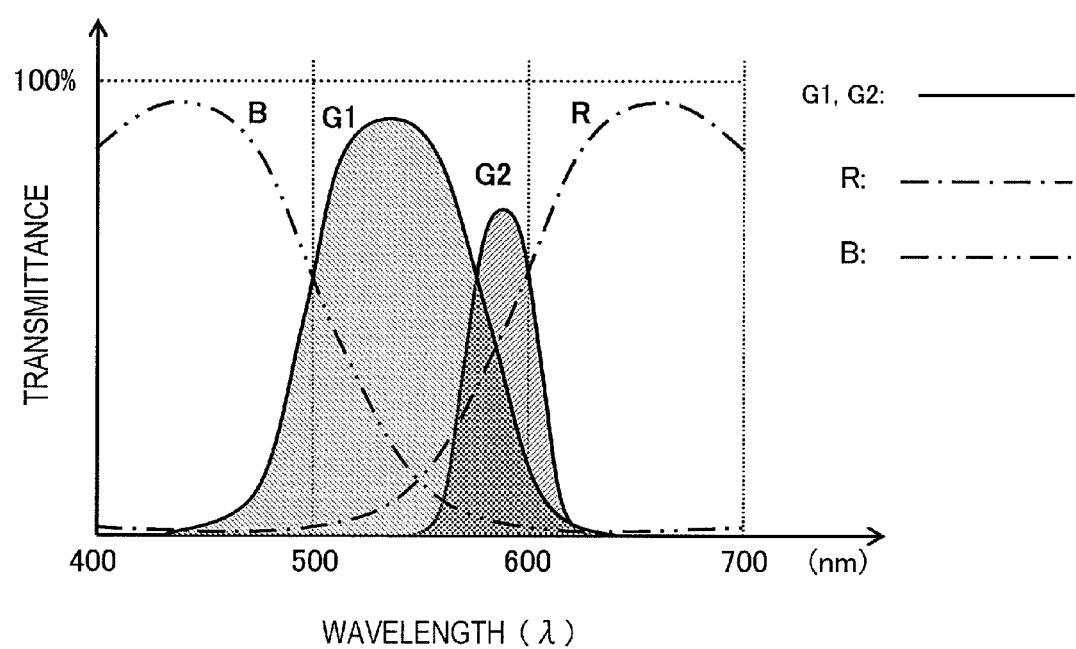
FIG. 8D A graph showing the spectral transmittance characteristics of respective color elements of the image sensor according to a modified example of the first embodiment.

Furthermore, as for the color elements of the image sensor 2a, R and B elements are supposed to be used besides the first and second G elements. However, this is only an example. Alternatively, there is no problem even if the R element is replaced with a magenta element with high R ray transmittance and if the B element is replaced with a magenta element with high B ray transmittance. Rather, if those elements are used, the incoming light can be used even more efficiently, which is advantageous. Furthermore, the G1 and G2 elements may have mutually different integral values of transmittances over the entire wavelength range of visible radiation. For example, as shown in FIG. 8D, the transmittances of the G1 and G2 elements with respect to a green ray may be set to be approximately 70% and approximately 30%, respectively. Even if the spectral transmittance characteristics of the respective elements are different from those of the embodiment described above but if their function forms are known, the signal processing can also be carried out just as described above.

Furthermore, in the embodiment described above, two kinds of filters G1 and G2 are supposed to be used as green elements in each pixel block of the image sensor 2a. However, they may be replaced with ordinary green elements which transmit most of the green ray. In that case, the combination of color elements used will be quite the same as that of a normal Bayer arrangement and Equations (2) and (3) will be combined into a single equation.

Figure 9:
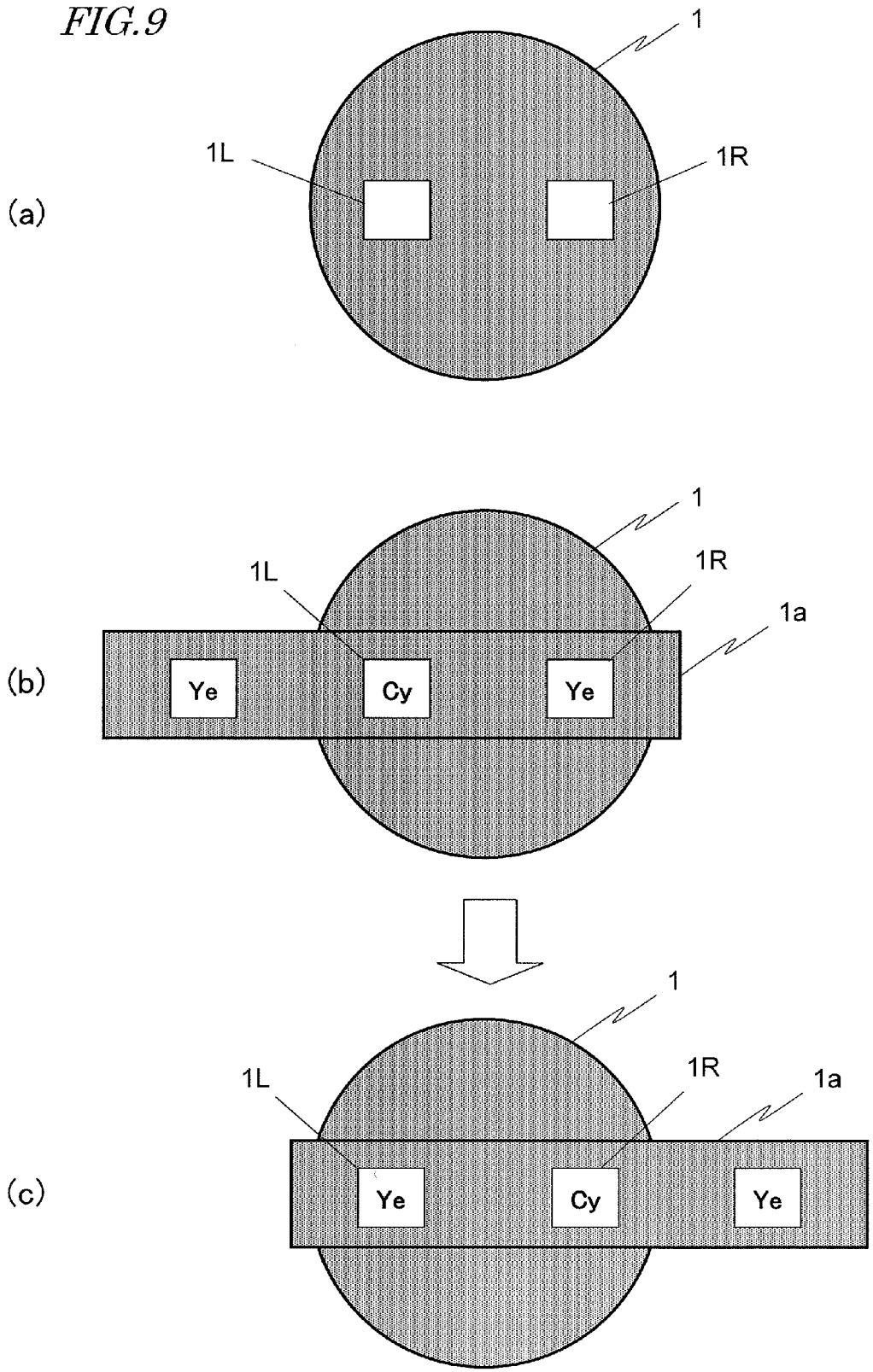
FIG. 9 Illustrates configurations for a light-transmitting plate according to modified examples of the first embodiment.

Furthermore, in the embodiment described above, the positions of color filters arranged over the two light-transmitting areas are supposed to be changed with each other by getting the light-transmitting plate 1 rotated by the rotating and driving section 9. However, those color filters may also change their positions even if the light-transmitting plate 1 is not rotated. For example, the positions of those filters may also be changed by sliding the color filters in one direction as shown in FIG. 9. A sliding plate 1a in which three color filters are arranged is attached to the light-transmitting plate 1 shown in FIG. 9. And by sliding the sliding plate 1a, the light-transmitting areas 1L and 1R can change their spectral transmittance characteristics with each other. In the example illustrated in FIG. 9, a Cy filter is arranged at the center of the sliding plate 1a and Ye filters are arranged at both ends. Without the sliding plate 1a, the light-transmitting areas 1L and 1R are both transparent as shown in FIG. 9(a). An image capturing session is performed for the first time with the Cy and Ye filters arranged over the light-transmitting areas 1L and 1R, respectively, as shown in FIG. 9(b). Subsequently, an image capturing session is performed for the second time with the Ye and Cy filters arranged over the light-transmitting areas 1L and 1R, respectively, as shown in FIG. 9(c). Even with such an arrangement adopted, the effects of the embodiment described above can also be achieved.

Embodiment 2

Hereinafter, a second embodiment of the present invention will be described. Major differences between this and first embodiments lie in the configuration of the light-transmitting plate 1 and in the processing to be performed by the image processing section 7. The following description of this second embodiment will be focused on those differences from the first embodiment and their common features will not be described all over again.

Figure 10:
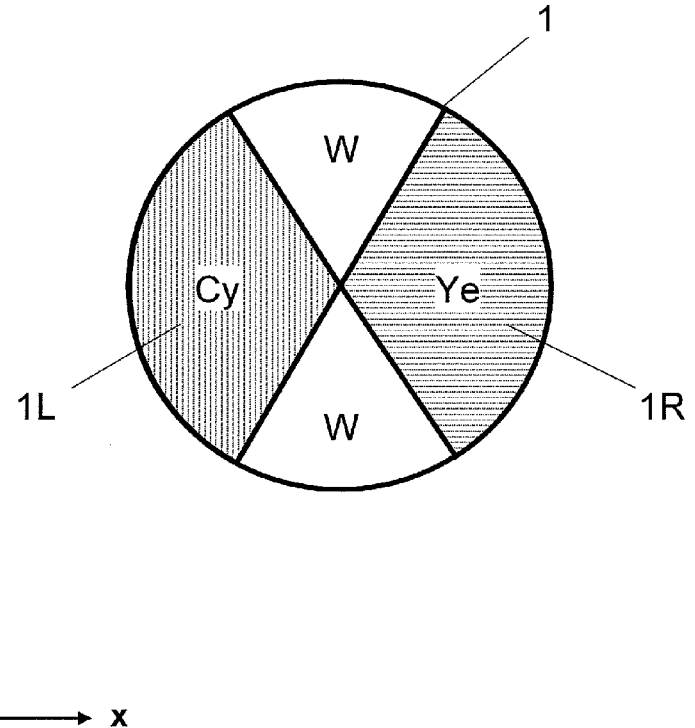
FIG. 10 A front view of a light-transmitting plate as a second embodiment.
Figure 11:
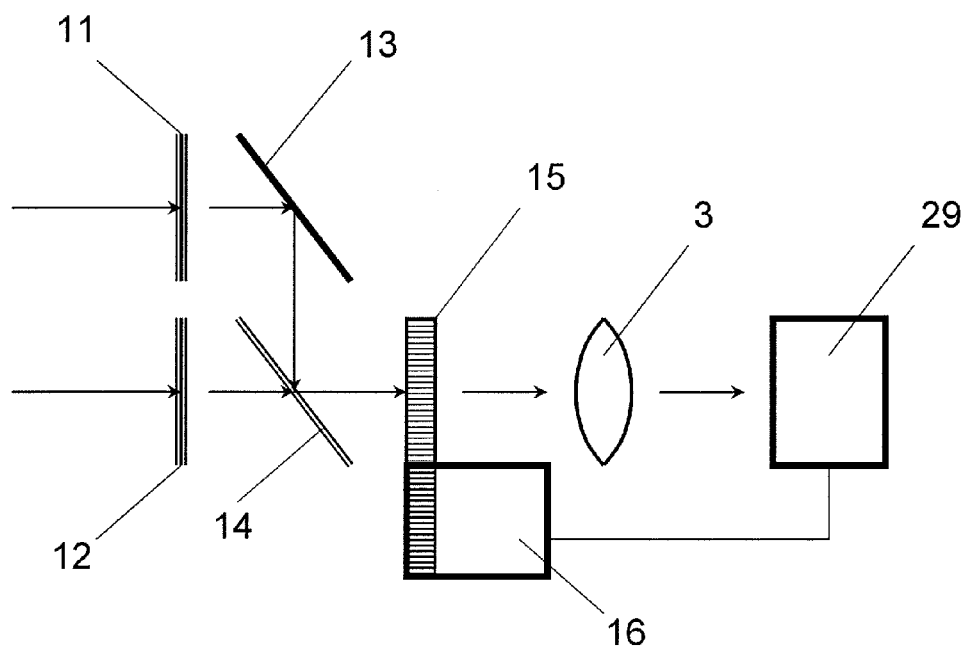
FIG. 11 Illustrates the arrangement of an image capturing system according to Patent Document No. 1.
Figure 12:
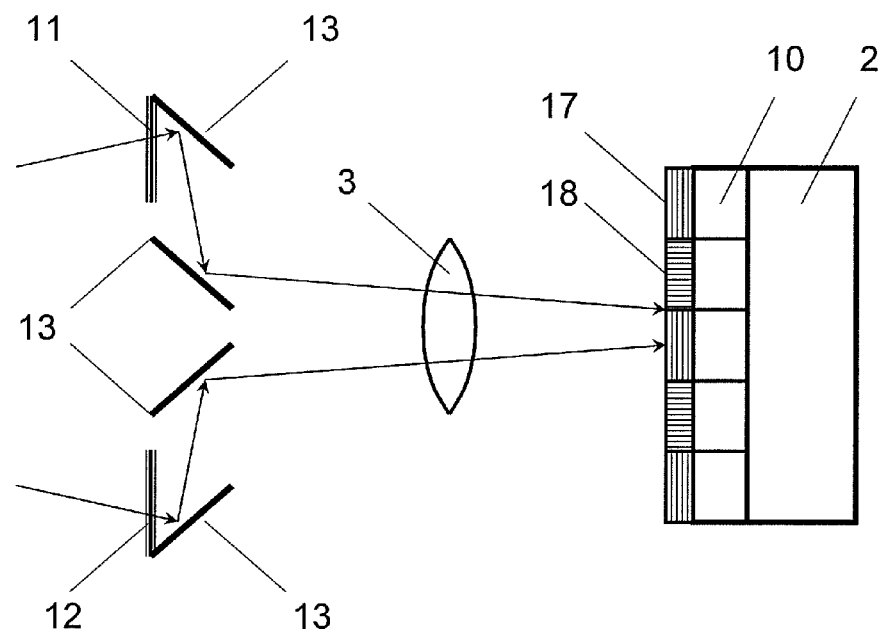
FIG. 12 Illustrates the arrangement of an image capturing system according to Patent Document No. 2.
Figure 13:
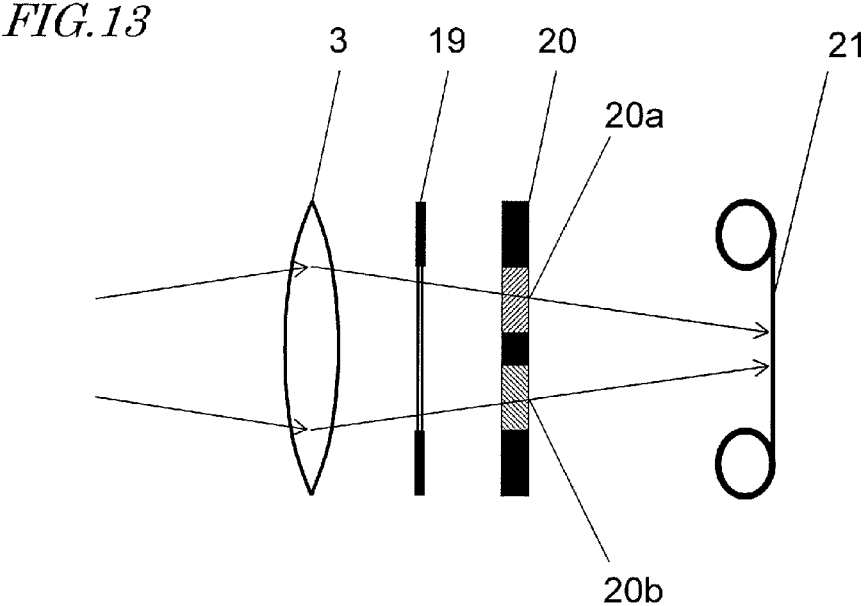
FIG. 13 Illustrates the arrangement of an image capturing system according to Patent Document No. 4.
Figure 14:
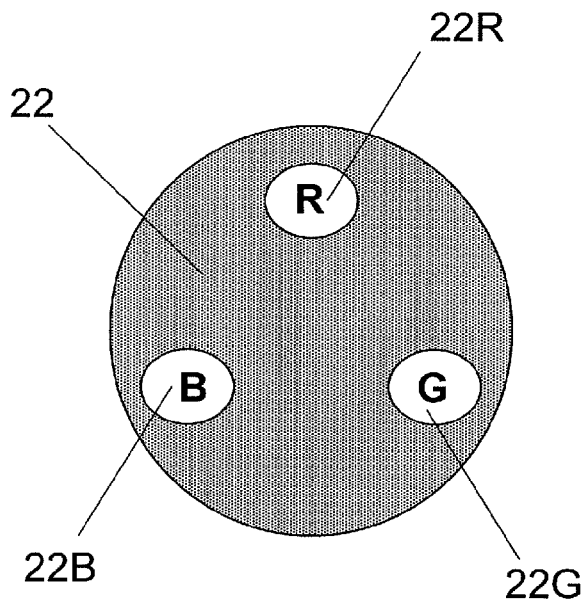
FIG. 14 Illustrates the appearance of a light beam confining plate according to Patent Document No. 5.
Figure 15:
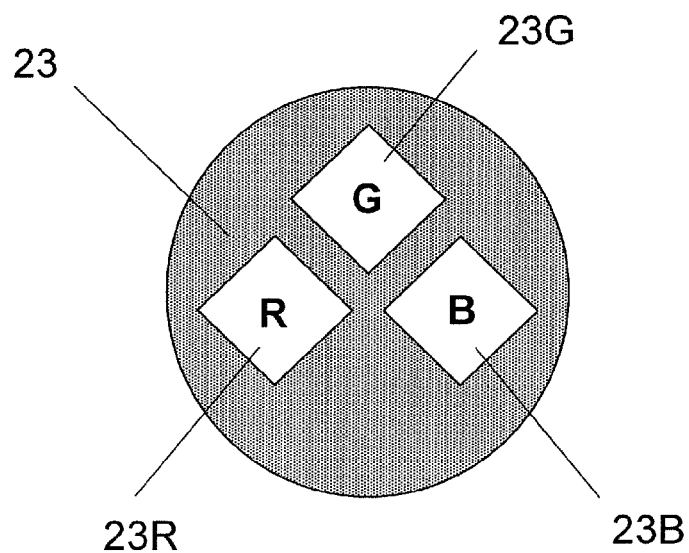
FIG. 15 Illustrates the appearance of a light beam confining plate according to Patent Document No. 6.

FIG. 10 is a front view of a light-transmitting plate 1 according to this embodiment. This light-transmitting plate 1 has a circular shape and has light-transmitting areas 1L, 1R and two transparent areas W. The light-transmitting areas 1L and 1R are arranged symmetrically with respect to the y-axis, while the two transparent areas W are arranged symmetrically with respect to the x-axis. The light-transmitting areas 1L, 1R and the two transparent areas W each have a fan shape. As in the first embodiment, Cy and Ye filters are arranged in the light-transmitting areas 1L and 1R, respectively. Those filters may have the same characteristics as their counterparts of the first embodiment. The transparent areas W may be made of a material (such as glass or air) which transmits most of incoming light (visible radiation) irrespective of the wavelength. To use incoming light as efficiently as possible, the optical transmittance of the transparent areas W may be set to be a high value. And the light-transmitting areas 1L and 1R are designed to have an equal area.

The members other than the light-transmitting plate 1 of this embodiment have the same configurations as their counterparts of the first embodiment. And the operation of the device according to this embodiment is also controlled through two image capturing sessions as in the first embodiment described above. But the image processing section 4 of this embodiment performs different arithmetic processing from the first embodiment.

Hereinafter, the flow of the arithmetic processing of this embodiment will be described. First of all, the subject image to be produced by the light rays that have been transmitted through the light-transmitting areas 1L and 1R and transparent areas W of the light-transmitting plate 1 is represented by two different expressions. Specifically, the subject image is represented by a first expression in which an image signal is expressed by R, G1 and B components, and is also represented by a second expression in which an image signal is expressed by R, G2 and B components. Next, as for each of these two expressions, images produced by the light rays that have been incident on the respective areas of the light-transmitting plate 1 are calculated using signals representing the respective color components. Finally, the signals representing those color components are synthesized together, thereby generating color multi-viewpoint images. The relation between the signals representing the light rays that have actually been incident on the respective areas and the signals representing those color components can be expressed by an equation that uses a 3×3 matrix. In this case, signals representing the images to be produced by the light rays that have been transmitted through the light-transmitting areas 1L and 1R and the transparent areas W in a situation where the areas 1L, 1R and W of the light-transmitting plate 1 and the respective color elements on the image sensor 2a are all supposed to be completely transparent are identified herein by L, R and C, respectively. Also, as for those images, signals associated with the $i^{th}$ (where i=1, 2) image capturing session are identified by the subscript i in parentheses added to their sign. Then, the relations between the pixel signals Rs(1), Rs(2), G1s(1), G1s(2), G2s(1), G2s(2), Bs(1) and Bs(2) and the signals L, R and C are given by the following Equations (19) and (20) for the first image capturing session and by the following Equations (21) and (22) for the second image capturing session, respectively:

$$\begin{pmatrix} Rs(1) \\ G1s(1) \\ Bs(1) \end{pmatrix} = \begin{pmatrix} Mu11 & Mu12 & Mu13 \\ Mu21 & Mu22 & Mu23 \\ Mu31 & Mu32 & Mu33 \end{pmatrix} \begin{pmatrix} L_1 \\ R_1 \\ C_1 \end{pmatrix} \quad (19)$$

$$\begin{pmatrix} Rs(1) \\ G2s(1) \\ Bs(1) \end{pmatrix} = \begin{pmatrix} Mu11 & Mu12 & Mu13 \\ Mu21' & Mu22' & Mu23' \\ Mu31 & Mu32 & Mu33 \end{pmatrix} \begin{pmatrix} L_1 \\ R_1 \\ C_1 \end{pmatrix} \quad (20)$$

$$\begin{pmatrix} Rs(2) \\ G1s(2) \\ Bs(2) \end{pmatrix} = \begin{pmatrix} Mv11 & Mv12 & Mv13 \\ Mv21 & Mv22 & Mv23 \\ Mv31 & Mv32 & Mv33 \end{pmatrix} \begin{pmatrix} L_2 \\ R_2 \\ C_2 \end{pmatrix} \quad (21)$$

$$\begin{pmatrix} Rs(2) \\ G2s(2) \\ Bs(2) \end{pmatrix} = \begin{pmatrix} Mv11 & Mv12 & Mv13 \\ Mv21' & Mv22' & Mv23' \\ Mv31 & Mv32 & Mv33 \end{pmatrix} \begin{pmatrix} L_2 \\ R_2 \\ C_2 \end{pmatrix} \quad (22)$$

In these Equations (19) through (22), each of the 3×3 matrix elements is a factor of proportionality represented by the wavelength integral value of the transmittance of a light ray that has been transmitted through each area of the light-transmitting plate 1 and incident on photosensitive cells facing the respective color elements of the image sensor 2a. For example, the respective elements of the 3×3 matrix of Equation (19) can be calculated by the following Equations (23) through (31), in which K' is a factor of proportionality and W(λ) is function representing the spectral transmittance characteristic of the W areas of the light-transmitting plate 1.

$$Mu11 = K' \int_r Cy(\lambda) O(\lambda) R(\lambda) d\lambda \quad (23)$$

$$Mu12 = K' \int_r Ye(\lambda) O(\lambda) R(\lambda) d\lambda \quad (24)$$

$$Mu13 = K' \int_r W(\lambda) O(\lambda) R(\lambda) d\lambda \quad (25)$$

$$Mu21 = K' \int_{g1} Cy(\lambda) O(\lambda) G1(\lambda) d\lambda \quad (26)$$

$$Mu22 = K' \int_{g1} Ye(\lambda) O(\lambda) G1(\lambda) d\lambda \quad (27)$$

$$Mu23 = K\mathcal{T}_{g1}W(\lambda)O(\lambda)G1(\lambda)d\lambda \tag{28}$$

$$Mu31 = K\mathcal{T}_{b}Cy(\lambda)O(\lambda)B(\lambda)d\lambda \tag{29}$$

$$Mu32 = K\mathcal{T}_{b}Ye(\lambda)O(\lambda)B(\lambda)d\lambda \tag{30}$$

$$Mu33 = K\mathcal{T}_{b}W(\lambda)O(\lambda)B(\lambda)d\lambda \tag{31}$$

In Equations (19) and (20), only parameters concerning the G1 and G2 components are different and parameters concerning the other color components are the same. The same can be said about Equations (21) and (22). If each of Equations (19) through (22) is multiplied on both sides by the inverse matrix of the 3×3 matrix on the right side from the left to the right, images represented by the light rays that have been transmitted through the respective areas can be obtained as given by the following Equations (32) through (35), in which the 3×3 matrix on the right side is the inverse matrix of the 3×3 matrix in Equations (19) to (22).

$$\begin{pmatrix} L_1 \\ R_1 \\ C_1 \end{pmatrix} = \begin{pmatrix} iMu11 & iMu12 & iMu13 \\ iMu21 & iMu22 & iMu23 \\ iMu31 & iMu32 & iMu33 \end{pmatrix} \begin{pmatrix} Rs(1) \\ G1s(1) \\ Bs(1) \end{pmatrix} \tag{32}$$

$$\begin{pmatrix} L_1 \\ R_1 \\ C_1 \end{pmatrix} = \begin{pmatrix} iMu11' & iMu12' & iMu13' \\ iMu21' & iMu22' & iMu23' \\ iMu31' & iMu32' & iMu33' \end{pmatrix} \begin{pmatrix} Rs(1) \\ G2s(1) \\ Bs(1) \end{pmatrix} \tag{33}$$

$$\begin{pmatrix} L_2 \\ R_2 \\ C_2 \end{pmatrix} = \begin{pmatrix} iMv11 & iMv12 & iMv13 \\ iMv21 & iMv22 & iMv23 \\ iMv31 & iMv32 & iMv33 \end{pmatrix} \begin{pmatrix} Rs(2) \\ G1s(2) \\ Bs(2) \end{pmatrix} \tag{34}$$

$$\begin{pmatrix} L_2 \\ R_2 \\ C_2 \end{pmatrix} = \begin{pmatrix} iMv11' & iMv12' & iMv13' \\ iMv21' & iMv22' & iMv23' \\ iMv31' & iMv32' & iMv33' \end{pmatrix} \begin{pmatrix} Rs(2) \\ G2s(2) \\ Bs(2) \end{pmatrix} \tag{35}$$

The image processing section 7 generates multi-viewpoint images by performing arithmetic processing on the two sets of L1, R1, C1, L2, R2 and C2 that have been calculated by Equations (32) through (35). Specifically, luminance signals L, R and C that will form the multi-viewpoint images may be generated in the following manner, for example. First of all, the average of L1 of Equation (32), L1 of Equation (33), L2 of Equation (34), and L2 of Equation (34) is calculated as the luminance signal of L. In the same way, as for R and C, the average of the respective signals is calculated as the luminance signal:

Luminance of L: {(L1 of Equation (32)+(L1 of Equation (33)+(L2 of Equation (34)+(L2 of Equation (35)}/4
Luminance of R: {(R1 of Equation (32)+(R1 of Equation (33)+(R2 of Equation (34)+(R2 of Equation (35)}/4
Luminance of C: {(C1 of Equation (32)+(C1 of Equation (33)+(C2 of Equation (34)+(C2 of Equation (35)}/4

Next, as for the color signals, the same signals are used for each of L, R and C. The R, G and B values may be obtained in the following manner, for example:

R value: $(Rs(1)+Rs(2))/2$
G value: $(G1s(1)+G2s(1)+G1s(2)+G2s(2))/4$
B value: $(Bs(1)+Bs(2))/2$ Next, color difference signals are generated based on these R, G and B values. In this case, the following color difference signals R-Y and B-Y are calculated by the NTSC method:

$R-Y=0.7R-0.59G-0.11B$
$B-Y=-0.3R-0.59G+0.89B$

Finally, using the luminance signal of L, R and C as YL, R, G and B values are calculated in the following manner for each of L, R and C:

$R=(R-Y)+YL$ $B=(B-Y)+YL$ $G=(YL-0.3R-0.11B)/0.59$

By performing such arithmetic processing, color multi-viewpoint images can be generated. According to this method, the luminance information of multi-viewpoint images is generated primarily with color information superposed additionally. This approach is taken because human eyes are sensitive to luminance information but less sensitive to color information by nature.

As described above, according to this embodiment, a light-transmitting plate 1 in which Cy and Ye filters are arranged horizontally (i.e., in the x direction) with transparent areas W added and a color image sensor with the Bayer arrangement which uses two kinds of G elements with mutually different transmittances are used. By performing image capturing sessions twice before and after the light-transmitting plate 1 is rotated 180 degrees and by performing arithmetic processing on the respective color signals using the 3×3 matrix, multi-viewpoint images can be obtained. Since the light-transmitting plate 1 is made up of complementary color filters and transparent members according to this embodiment, multi-viewpoint images can be obtained with good sensitivity by using the incoming light highly efficiently.

In the embodiment described above, the areas of the Cy and Ye filters and the transparent areas are supposed to have the same size in the light-transmitting plate 1. However, this is only an example and those areas may have different sizes, too.

In the embodiments described above, the image processing is supposed to be carried out by the image processing section 7 that is built in the image capture device. However, such image processing may also be carried out by another device that is provided independently of that image capture device. For example, even if a signal that has been obtained by an image capture device including the image capturing section 100 of the embodiment described above is loaded into another device (image processor) to get a program defining the signal arithmetic processing described above executed by a computer built in the image processor, the effects of the embodiments described above can also be achieved.

INDUSTRIAL APPLICABILITY

A 3D image capture device according to an embodiment of the present invention can be used effectively in any camera that ever uses a solid-state image sensor. Examples of those cameras include consumer electronic cameras such as digital cameras and digital camcorders and solid-state surveillance cameras for industrial use.

REFERENCE SIGNS LIST 1 light-transmitting plate
1L, 1R light-transmitting area
2 solid-state image sensor
2a color solid-state image sensor
3 optical lens
4 infrared cut filter
5 signal generating and image signal receiving section
6 sensor driving section
7 image processing section
8 image interface section
9 rotating and driving section
10 pixel
11 0-degree-polarization polarizer 12 90-degree-polarization polarizer
13 reflective mirror
14 half mirror
15 circular polarization filter
16 driver that rotates polarization filter
17, 18 polarization filter
19 lens diaphragm
20, 22, 23 light beam confining plate
20a color filter that transmits red-based light
20b color filter that transmits blue-based light
21 photosensitive film
22R, 23R R ray transmitting area of light beam confining plate
22G, 23G G ray transmitting area of light beam confining plate
22B, 23B B ray transmitting area of light beam confining plate
29 image capture device
30 memory
40 pixel block
60 photosensitive cell
100 image capturing section
200 signal processing section

The invention claimed is:

1. A 3D image capture device comprising:
   a light-transmitting section including first and second light-transmitting areas, the first light-transmitting area having a property to transmit light falling within a first wavelength range that is included in a color blue wavelength range and light falling within a second wavelength range that is included in a color green wavelength range, the second light-transmitting area having a property to transmit light falling within a third wavelength range, which is included in the color green wavelength range and of which the wavelength is longer than the second wavelength range, and light falling within a fourth wavelength range that is included in a color red wavelength range;
   an image sensor that is arranged to receive the light that has been transmitted through the light-transmitting section;
   a lens system that produces an image on an imaging area of the image sensor; and
   an image capturing driver that drives the image sensor so as to perform image capturing sessions at least twice in a row and that drives the light-transmitting section so that the first and second light-transmitting areas change their positions with each other every time an image capturing session is carried out,
   wherein the image sensor has a plurality of pixel blocks that are arranged two-dimensionally on the imaging area, and
   wherein each of the plurality of pixel blocks includes first, second, third and fourth pixels that mainly sense light rays falling within the first, second, third and fourth wavelength ranges, respectively.

2. The 3D image capture device of claim 1, further comprising an image processing processor that generates multi-viewpoint images based on a pixel signal supplied from the image sensor.

3. The 3D image capture device of claim 1, wherein the first and second light-transmitting areas are configured so that a sum of a a spectral transmittance characteristic of the first light-transmitting area represented by a function and a spectral transmittance characteristic of the second light-transmitting area represented by another function does not have wavelength dependence.

4. The 3D image capture device of claim 1, wherein the light-transmitting section further includes a transparent area.

5. The 3D image capture device of claim 1, wherein the second wavelength range is from 500 nm to 550 nm and the third wavelength range is from 550 nm to 600 nm.

6. The 3D image capture device of claim 1, wherein the image sensor has a Bayer type pixel arrangement.

7. The 3D image capture device of claim 1, wherein the first and second light-transmitting areas are arranged symmetrically with respect to the center of the light-transmitting section, and
   wherein the image capturing driver rotates the light-transmitting section 180 degrees on the center of the light-transmitting section as the axis of rotation, thereby changing the positions of the first and second light-transmitting areas with each other every image capturing session.

8. An image processor that generates multi-viewpoint images based on a signal supplied from a 3D image capture device, the device comprising:
   a light-transmitting section including first and second light-transmitting areas, the first light-transmitting area having a property to transmit light falling within a first wavelength range that is included in a color blue wavelength range and light falling within a second wavelength range that is included in a color green wavelength range, the second light-transmitting area having a property to transmit light falling within a third wavelength range, which is included in the color green wavelength range and of which the wavelength is longer than the second wavelength range, and light falling within a fourth wavelength range that is included in a color red wavelength range;
   an image sensor that is arranged to receive the light that has been transmitted through the light-transmitting section;
   a lens system that produces an image on an imaging area of the image sensor; and an image capturing driver that drives the image sensor so as to perform image capturing sessions at least twice in a row and that drives the light-transmitting section so that the first and second light-transmitting areas change their positions with each other every time an image capturing session is carried out,
   wherein the image sensor has a plurality of pixel blocks that are arranged two-dimensionally on the imaging area, and wherein each of the plurality of pixel blocks includes first, second, third and fourth pixels that mainly sense light rays falling within the first, second, third and fourth wavelength ranges, respectively.

* * * * *